April 30, 1963  R. A. JEWELL  3,087,717
FLUID PRESSURE SPRING WITH RESILIENT PARTITIONS
Filed April 25, 1960  2 Sheets-Sheet 1

INVENTOR
Robert A. Jewell

BY Mason, Fenwick & Lawrence
ATTORNEYS

April 30, 1963  R. A. JEWELL  3,087,717
FLUID PRESSURE SPRING WITH RESILIENT PARTITIONS
Filed April 25, 1960  2 Sheets-Sheet 2

INVENTOR
Robert A. Jewell
BY Mason, Fenwick & Lawrence
ATTORNEYS

United States Patent Office 3,087,717
Patented Apr. 30, 1963

3,087,717
FLUID PRESSURE SPRING WITH
RESILIENT PARTITIONS
Robert A. Jewell, Savannah, Ga., assignor to Great Dane
Trailers, Inc., Savannah, Ga., a corporation of Georgia
Filed Apr. 25, 1960, Ser. No. 24,288
10 Claims. (Cl. 267—35)

The present invention relates to means to be interposed between a load and its support to absorb, or reduce, shocks to the load resulting from relative movement between the support and load. The means of the present invention is peculiarly adapted to use as a spring for vehicles, but is not limited to that use.

The general object of the present invention is to provide a shock absorber, or spring, which utilizes a resilient material and a compressible fluid together to produce a spring action which is the result of the combined reaction of the two materials under load.

A more specific object is to provide a spring which is composed of one or more chambers containing compressible fluid with at least one wall of the chamber, or chambers, being of resilient material which will flex under pressure, whereby the degree of flexing of the resilient wall will determine the ultimate compression of the fluid.

Another object is to provide a spring which achieves its result through flexing a resilient member and compressing a fluid, wherein the uncompressed fluid pressure is fixed and the fluid may be in several separated bodies each having a predetermined pressure prior to imposing the load.

Still another object is to provide springs having the above-described characteristics which can be arranged and connected in tandem, so that part of the shock on one spring can be transmitted to the other to provide for equalization of the shock between two or more members.

Other objects of the invention will become apparent from the following description of several practical embodiments thereof, when taken in conjunction with the drawings which accompany, and form part of, this specification.

Figure 5:
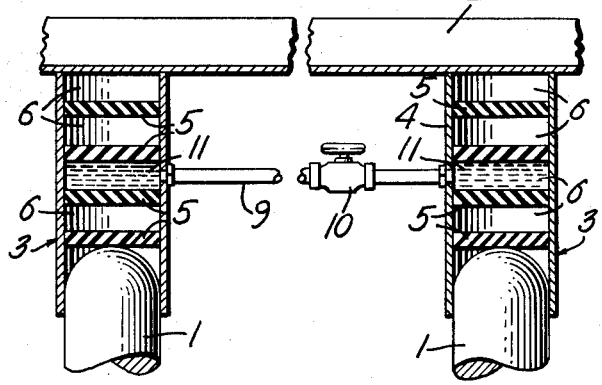
Figure 6:
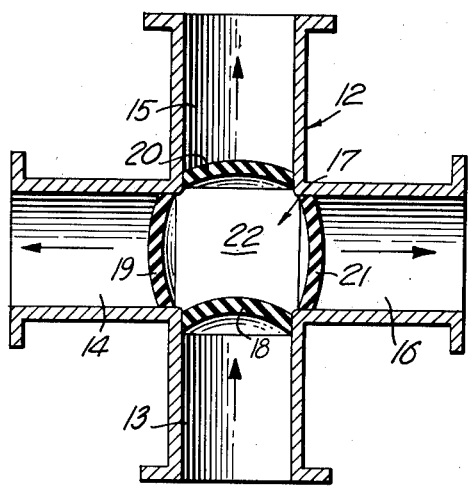
Figure 7:
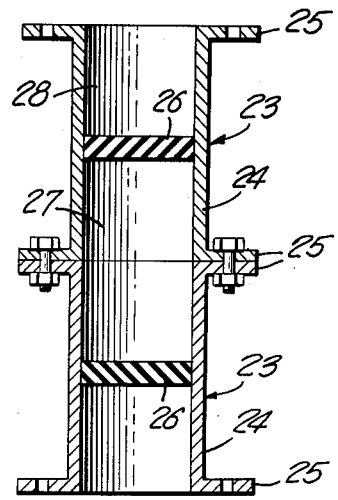
Figure 8:
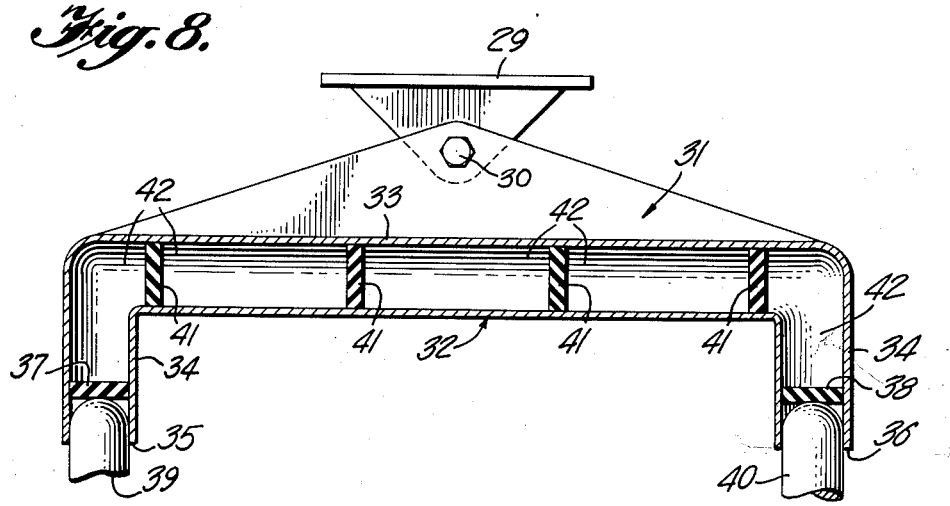

FIGURE 5 diagrammatically shows two of the spring units interconnected for tandem operation;

FIGURE 6 illustrates a unit in which a force may be transmitted unidirectionally;

FIGURE 7 shows identical elements designed for coupling together to provide springs of desired characteristics; and FIGURE 8 is a diagrammatic showing of another tandem arrangement.

In general, the invention contemplates a spring, or shock absorber, which comprises a plurality of resilient disks, partitions, or diaphragms, spaced apart and bridging the walls of a rigid shell to define a plurality of chambers between them, with the disks forming the separating walls between chambers. The chambers may be filled with air, gas, or other compressible fluid under desired pressure. The flexing of the partition disks and resultant compression of the fluid in the chambers under load will provide a spring, or shock absorbing, action.

Figure 1:
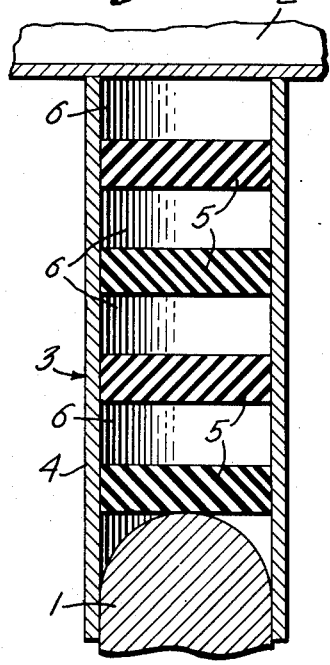
FIGURE 1 is a somewhat schematic vertical section through a shock absorber, or spring, embodying the principles of the present invention, shown in unloaded condition.
Figure 2:
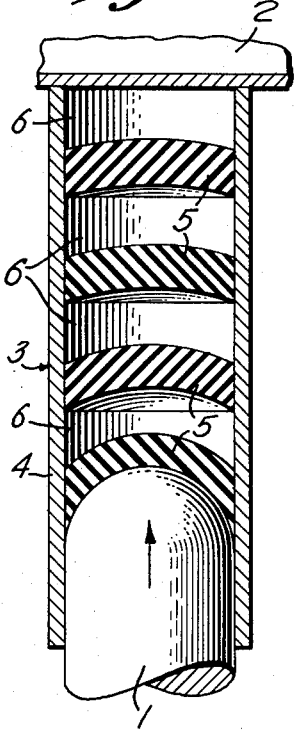
FIGURE 2 is a view similar to FIGURE 1 but showing the spring under load.

Referring to the drawings in detail, and adverting first to FIGURES 1 and 2 of the drawings, the invention is shown quite schematically in order to illustrate the basic principles involved. The support, or thrust force, is represented by the plunger 1; the load, or member, to be supported is shown as a rectangular mass 2; and, the load bearing spring, or shock absorber, 3 is interposed between the two. If, for example, the spring 3 is to be used in a vehicle, the plunger 1 will be connected to the wheels, or wheel structure, and the load will be the vehicle frame, or body, and whatever may be carried therein.

The spring will be formed of a housing, or shell, 4 which is bridged by a plurality of disks, partitions, or diaphragms, 5 to form a number of chambers 6 within the shell. The disks will be of resilient material, such as rubber, which will be capable of flexing, and which will have some degree of stretch. The freedom with which the disks flex and stretch will determine, to some extent, the relative softness or stiffness of spring action and the loads which may be supported. The shell 4 will be of rigid material, such as metal, and can be circular, rectangular, or other desired shape in cross-section. A shell of circular cross-section will provide for the most uniform disk action during flexing. The disks, or partitions, will lie normal to the longitudinal axis of the shell and will have the shape and size of the interior of the shell. The disks will be rigidly fixed to the shell wall around their entire perimeters, preferably by bonding. This will provide an absolutely air tight connection between the shell and disk. The disks will be spaced apart longitudinally of the shell to divide the shell into the series of compartments, or chambers, 6. The spacing between the disks may be uniform, as shown, or varied to form chambers of any desired size in any desired order. When the disks are bonded to the shell, air at atmospheric pressure will be trapped in each of the chambers 6.

A spring constructed as above-described may be attached to the load it is to support by welding, or otherwise securing, one end of the shell to a suitable portion of the load. If the shell is welded in place, an additional chamber will be formed between the top disk and the base of the load. The plunger 1 may then be inserted in the bottom end of the shell and the bottom disk will rest upon it.

A study of FIGURE 2 will make it clear that as the weight of the load is imposed upon the plunger, the bottom disk will be flexed upwardly. This in turn, will cause the fluid, in this case air, in the bottom chamber to be compressed. As the air pressure is increased, it will cause flexing of the disk forming the opposite wall and subsequent compression of the air in the second chamber. This action is continued throughout the length of the spring. The upward thrust exerted by the plunger is absorbed partly by the flexing disks and partly by the compressed. As the air pressure is increased, it will cause this, the full thrust of the plunger is directed upon the bottom disk, but part of the force is used in overcoming the resistance of the disk to flexing and stretching. Only the portion of the initial thrust not absorbed by the disk is exerted to compress the fluid in the bottom chamber. The pressure in this chamber must be built up sufficiently to overcome the resistance of the next disk before that disk will bend. Thus, the thrust imparted by each disk upon the chamber above it will be less than that transmitted by the disk below. This will result in each upwardly succeeding disk being flexed less than the one below, and each upwardly succeeding chamber being under less compression than the one below.

While the above-described structure forms the basis for the spring of the present invention, and the structure would support and cushion light loads, it will be necessary, or desirable, in many cases to preload one or more of the fluid chambers to provide a spring of sufficient stiffness. This can be accomplished in several ways.

Figure 3:
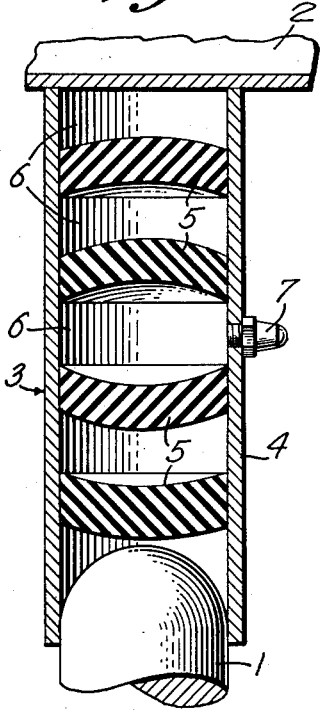
FIGURE 3 is another vertical section illustrating a slightly modified structure.

In FIGURE 3 a spring is shown which is identical with that of FIGURES 1 and 2 except for the provision of a valve 7 extending through the side wall of the shell 4 to provide communication to the center chamber. By means of the valve, the center chamber may be put under any desired pressure by connecting the valve to a suitable source of compressed air, or other fluid under pressure. The loading of the center chamber will result in flexing outwardly the walls of that chamber with a consequent compression of the air in the next adjacent chambers. Thus, by loading the center chamber all of the chambers will be preloaded, with the pressures in the chambers being progressively less as they are progressively spaced from the center chamber. This spring will function in the same manner as the one first described, but it will be stiffer and greater loads will be supported without undue spring compression.

Figure 4:
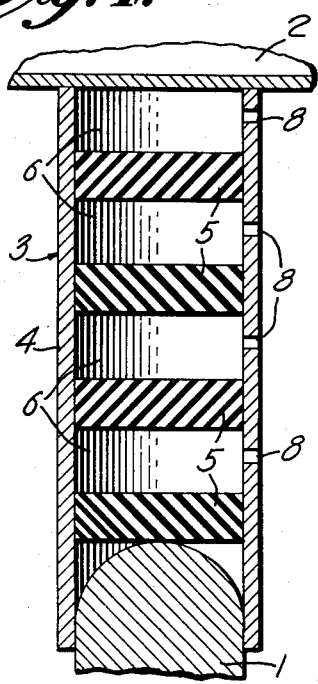
FIGURE 4 shows a still further modification of the basic structure.

FIGURE 4 shows a further modification wherein the shell 4 is provided with a plurality of openings 8, one communicating with each chamber 6. With this construction, each chamber may be preloaded and its opening then sealed. The chambers may be loaded to any extent, or in any ratio. They may be equally loaded, or the chambers may be loaded differentially, to provide a spring of specific characteristics. For example, by loading the upper chambers and having the lower chambers under low fluid pressure, a spring which will have soft initial action and stiffer action under heavy shock will be provided. Other arrangements will be obvious.

Frequently, it may be desired to connect two or more springs 3 to provide a tandem connection, or to supply a compensating hook-up. To do this, a pair of springs will be mounted side by side and connected to a common load 2. Each will have its plunger 1 which, if the springs are to be used on a vehicle, will be mounted on the wheels. A chamber of one spring, preferably the center chamber, will be connected to a similar chamber of the other by means of a pipe line 9. A valve 10 may be mounted in the line so that the two springs may be intercoupled for compensating action, or they may be cut off from one another for independent action. In this arrangement, the interconnected chambers and the pipe line 9 will be filled with an incompressible liquid 11. When relative movement between the load and one plunger takes place, the spring with which the plunger acts will have its several disks flexed and the chambers reduced in capacity, thus forcing some of the liquid out of the central chamber, through the pipe line 9 and into the central chamber of the second spring, setting up an opposite reaction in the second spring to offset, or compensate for, the action of the first. This action will continue for as long as the valve 10 is left open. When the valve is closed, the two springs will function independently in the manner previously described.

In FIGURE 6, there is shown a modified arrangement wherein the application of a force in one direction will result in unidirectional dispersion of that force. The casing 12 is cruciform, having the four branches 13, 14, 15 and 16 emanating from a common center 17. Each of the branches is bridged adjacent its joinder to the center by a flexible diaphragm, or disk, the disks being shown at 18, 19, 20 and 21. This forms a closed chamber 22 at the center.

With the structure shown in FIGURE 6, a force in one branch, or against one disk, for example the branch 13 or disk 18, will result in compression of the fluid in the central chamber 23 and equal deflection and extension of the diaphragms 19, 20 and 21. Thus, an equal force will be exerted along each branch, or upon the air column in each branch if the branches are closed at their ends by connection to loads.

The structure shown in FIGURE 7 provides a spring unit which can be joined to other similar units to form a spring of desired characteristics. Each unit 23 includes a length of tubular casing 24 having flanges 25 top and bottom. The flanges may be apertured to receive bolts, or other fastening means. A disk, or diaphragm, 26 bridges the casing midway between its ends.

It will be obvious that two or more of the above-described units may be joined end-to-end by bolting, riveting, or welding the abutting flanges, and air chambers will be formed between disks of adjacent units to function in the manner of the chambers previously described. If, for example, two of the units are joined as shown in FIGURE 7, the load may be attached to the top of the top unit, and the assembled units placed upon a support so that the support will contact the bottom disk 26. The space within the joined casings between the disks will form an air chamber 27. Another chamber 28 will be formed between the top disk and the top of the top casing. It will be apparent that the resultant structure will function precisely as the one shown in FIGURE 1.

FIGURE 8 shows a tandem mount which includes the air spring. In this arrangement, at least part of the thrust force, or shock, is absorbed by the spring and that portion not absorbed will be delivered as an opposite force to the other support member of the tandem arrangement.

In FIGURE 8, there is shown a load-supporting plate 29, to which is attached by pivot 30 a tandem rocker 31. The rocker includes an inverted U-shaped tubular casing 32 which has a horizontal section 33 and the depending legs 34 having open bottom ends 35 and 36. Disks 37 and 38 will be located in the respective legs of the U-casing near the bottom, upon which the supports 39 and 40 will bear. Other disks 41 will be spaced along the casing, dividing the casing into a plurality of fluid chambers 42. It will be obvious that an upward force delivered by one of the supports will result in flexing of the disk resting upon the support, with consequent compression of the fluid in the several chambers and flexing of the remaining disks. As some of the thrust is absorbed by fluid compression, the flexing of the disks will progressively diminish in a direction away from the support imposing the thrust. Naturally, the resulting force upon the other support will be reduced. The movement differential will be compensated for by tilting movement of the rocker.

From the above, it will be evident that the structure disclosed will provide an efficient spring which combines the shock absorbent action of a resilient material such as rubber in shear with the cushioning effect of a fluid in compression to obtain its result. The resiliency of the shear material will be selected in accordance with predetermined requirements, and the compressibility of the fluid medium may be determined at the outset and the chambers preloaded and sealed, or the chamber loading may be changed from time to time as needed by providing one or more of the chambers with a valve connection. Thus, springs having a constant, predetermined spring rate may be provided, or the spring-rate may be varied. The particular construction allows for wide variation of loading to obtain different spring actions to meet different requirements.

While in the above practical embodiments of the invention have been disclosed, it will be understood that the physical embodiments of the invention herein described and shown are merely by way of example and the invention may take other forms within the scope of the appended claims.

What is claimed is:

1. A spring comprising, an elongated rigid tubular shell, a plurality of imperforate resilient partitions bridging the shell and fixed thereto in spaced relation longitudinally of the shell to provide a plurality of fluid-tight chambers within the shell, compressible fluid in each of the chambers at predetermined pressures, and a support slidable in the shell to bear upon one end partition.

2. A spring as claimed in claim 1 wherein, the partitions are of rubber and bonded to the shell.

3. A spring as claimed in claim 1 wherein, the shell has at least one opening therein communicating with a chamber through which compressible fluid may be put into or removed from the chamber.

4. A spring comprising, an elongated rigid tubular shell, a plurality of imperforate rubber spring disks bridging the shell and bonded thereto around their peripheries and arranged in spaced relation longitudinally of the shell to form a plurality of chambers, sealable openings in the shell communicating with each chamber so that the chambers may be preloaded with compressed air to predetermined pressure, and a support slidable in the shell to bear upon one end rubber spring disk.

5. A spring comprising, an elongated rigid tubular shell, a plurality of imperforate resilient partitions spaced from the ends of the shell and bridging the shell and fixed thereto in spaced relation longitudinally of the shell defining a plurality of chambers within the shell, with the chambers being filled with a fluid at predetermined pressure the fluid in at least one of the chambers being compressible, and a support slidable in one end of the shell to bear upon one of the partitions.

6. A spring as claimed in claim 5 wherein, the shell has its ends at right angles to the remainder and the partitions are in the angularly related ends, a second support slidable in the other end of the shell, and means intermediate the ends of the shell to pivotally attach the shell to a load to be carried.

7. A spring as claimed in claim 6 wherein, there are additional resilient partitions spaced along the shell intermediate the end partitions dividing the shell into a plurality of chambers.

8. A spring as claimed in claim 5 wherein, there are a plurality of resilient partitions dividing the shell into a plurality of chambers, a second similar shell having similar partitions and similar chambers and slidable upon a similar support, one chamber of each shell being interconnected to a similar chamber of the other shell by a conduit, the interconnected chambers being filled with an incompressible liquid.

9. A spring as claimed in claim 8 wherein, there is a shut-off valve in the conduit.

10. A spring as claimed in claim 5 wherein, the shell has a plurality of branches emanating from a common center, there being a resilient partition bridging each branch adjacent the center whereby the said chamber is at the center of the shell, whereby slidable movement of the support will flex the partition upon which the support bears and the force of the flexing movement will be transmitted through the fluid of the chamber and the other partitions to the several branches of the shell.

References Cited in the file of this patent

UNITED STATES PATENTS

| | | |
|---|---|---|
| 2,808,070 | Malsbary | Oct. 1, 1957 |
| 2,894,742 | Peterson | July 14, 1959 |
| 2,984,476 | Turner | May 16, 1961 |

FOREIGN PATENTS

| | | |
|---|---|---|
| 728,501 | Germany | Nov. 27, 1942 |
| 962,036 | France | Nov. 28, 1949 |
| 813,259 | Great Britain | May 13, 1959 |